Sept. 16, 1958 — F. J. HOLZER — 2,852,200
FOOD WASTE DISPOSER
Filed Aug. 1. 1955 — 2 Sheets-Sheet 2
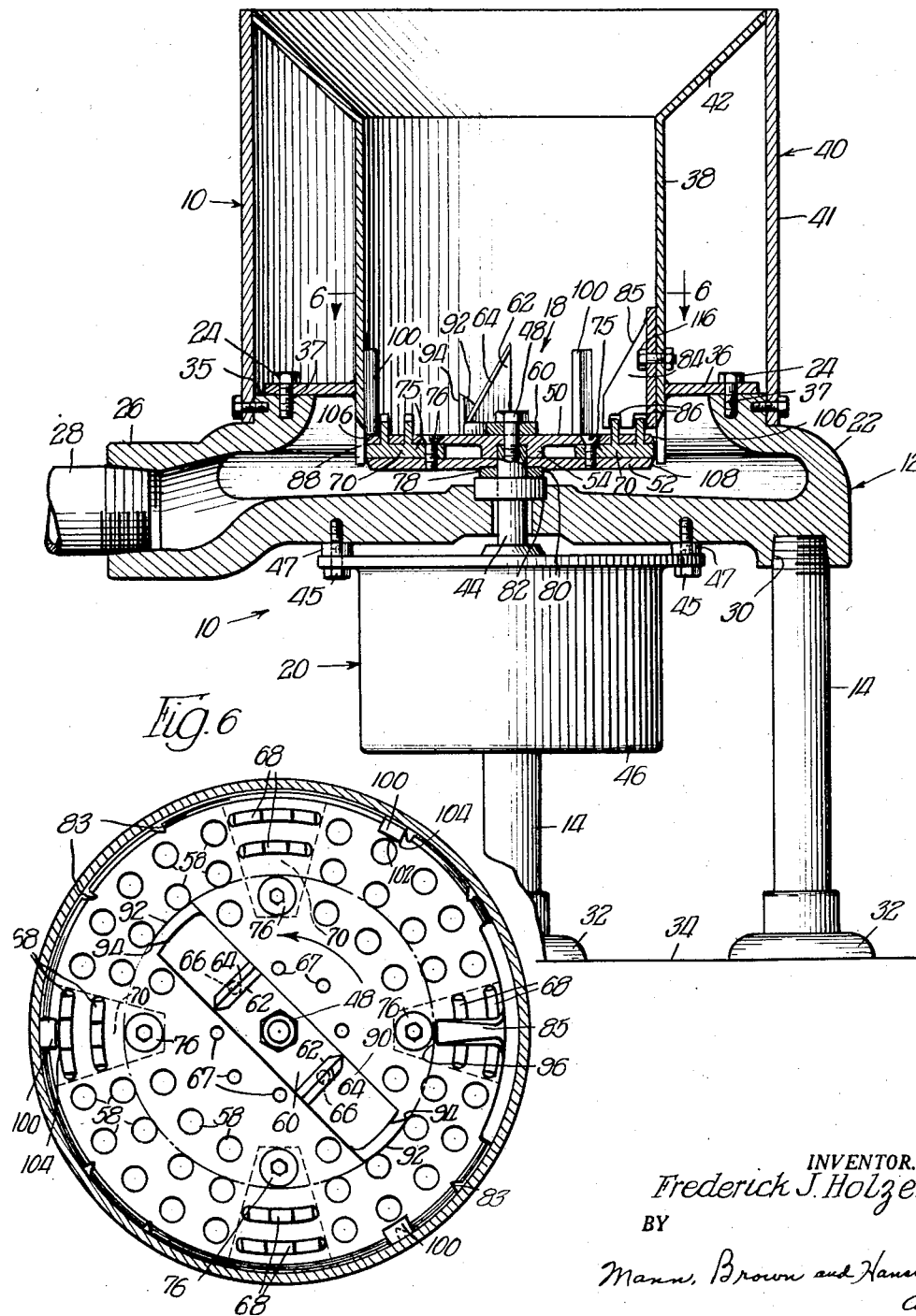

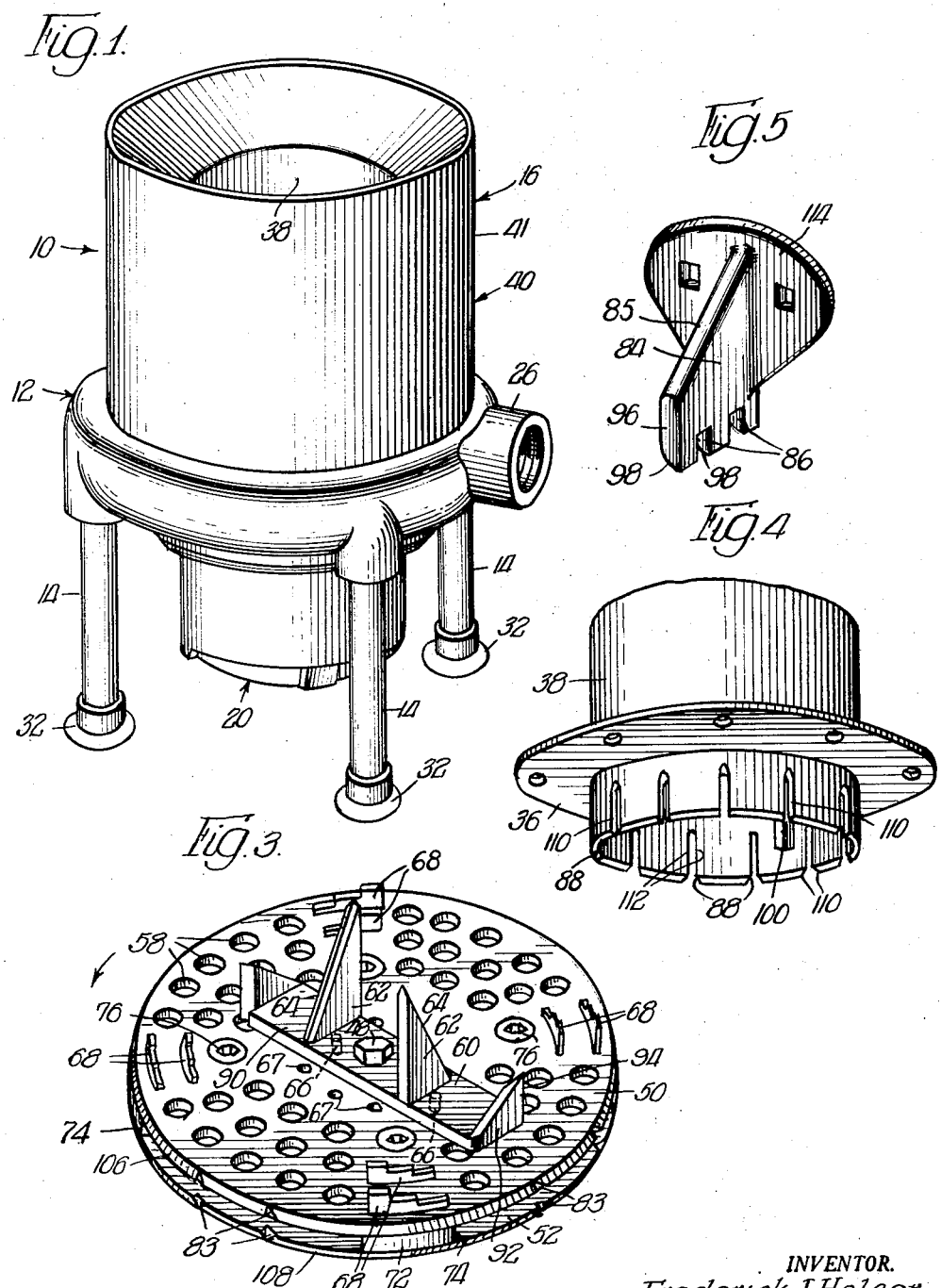

2,852,200
Patented Sept. 16, 1958

United States Patent Office

2,852,200
FOOD WASTE DISPOSER

Frederick J. Holzer, Flossmoor, Ill., assignor, by mesne assignments, to Frederick J. Holzer, Anthony B. Ross, and James J. Becher, trustees Application August 1, 1955, Serial No. 525,653

9 Claims. (Cl. 241—46)

The present invention relates to a food waste disposer, and more particularly to a food waste disposer for fibrous waste in which food waste is reduced in size to relatively fine particles so that it may be disposed of by introducing it into sewage disposal systems.

In my application Serial No. 440,964, filed July 2, 1954, of which this application is a continuation-in-part, I disclose a food waste disposer comprising a cylindrical hopper supported by a hollow base and having a cylindrical rotor or cutter head rotatably mounted therein. The rotor or cutter head comprises a pair of plates secured together in spaced apart relation, with the upper or upstream plate being formed with a plurality of perforations providing communication with the space between the two said plates, and the lower plate being imperforate. A pair of knife blades are fixed to the upper or upstream surface of said upper plate, said knife blades being symmetrically positioned thereon and projecting from said rotor up into said hopper. A plurality of symmetrically located saw-like shearing blades are secured adjacent the periphery of the rotor, which blades pass through appropriately spaced notches in a plate, or series of plates, fixed to the wall of the hopper. The lower portion of the hopper in which the rotor is positioned extends into the hollow portion of said base, and is formed with a plurality of perforations of relatively small size with which the space between said rotor plates is aligned. Said shearing blades include laterally extending bases positioned within said space between said rotor plates, and said bases are each provided with a shoulder which presents a cutting edge adjacent said plurality of relatively small perforations formed in said hopper. The hollow base is connected to a suitable pipe that may lead to a conventional sewage disposal system.

Food waste is placed in the hopper together with a quantity of water and the cutter head or rotor is actuated by a motor or other power means. The knife blades, which may be termed the primary chopper, chop up the larger particles of food, the pieces of which are then carried by centrifugal force to the orbit of the shearing blades. The shearing blades cooperate with the fixed plate or plates to provide a shearing cutting action which is particularly effective in reducing the size of fibrous materials. These blades reduce the size of the waste particles to the point where the particles may be forced through the perforations in the upper plate, this action also tending to shear the waste particles into smaller pieces or particles. After passing through the top plate, the food particles and water are urged by centrifugal force outwardly of the axis of the head or rotor and through the perforations in the lower portion of the hopper. The cutting edges of the bases of the shearing blades operate adjacent the inside surfaces of these perforations and provide a further cutting action on the waste, as passage of the waste through the last mentioned perforations occurs. The mixture of waste particles and water passes from the perforations in the hopper into the hollow base from which it may be discharged into a sewage system.

The present application is directed to certain improvements which particularly adapt my device for acting on fibrous food waste, such as corn cob husks.

The principal object of the invention is to provide a food waste disposal unit which effectively handles fibrous food waste.

Another object of the invention is to provide a rotary type of food waste disposer in which the elements thereof are especially shaped and arranged to handle fibrous food waste with facility.

Other objects, uses and advantages will be obvious or become apparent from a consideration of the following description and drawings.

In the drawings:

Figure 1 is a perspective view of one embodiment of the modified device;

Figure 2 is a vertical cross-sectional view through the axial center of the device, showing some parts in elevation;

Figure 3 is a perspective view of the cutter head or rotor employed in the device illustrating the cutting means carried thereby;

Figure 4 is a perspective view of the lower portion of the hopper of the device, within which the cutter head or rotor operates;

Figure 5 is a perspective view of the plate with which the shearing blades of the cutter head cooperate; and, Figure 6 is a cross-sectional view along line 6—6 of Figure 2.

Referring now more particularly to the drawings, wherein like reference numerals are employed to indicate like parts, reference numeral 10 of Figures 1 and 2 generally indicates a preferred embodiment of the invention comprising a hollow base 12 including adjustable legs 14, hopper and side enclosure 16, cutter head or rotor or cylindrical member 18, and power means 20.

The base 12 may be made of cast iron or the like, to minimize vibration, and is formed with an upwardly extending neck 22 to which the hopper and side enclosure 16 is secured by suitable means, such as bolts 24, and an outlet 26 which may be threaded for connection to a standard size pipe 28 that leads to the point of disposal. The base 12 is formed with a number of tapped holes 30 which may be screw-threaded to receive the legs 14. These legs may be provided with screw-threadedly mounted feet 32. This arrangement of the legs permits the unit to be adjusted in height and to allow for irregularities in the supporting surface 34. The top of the neck of the base is provided with a finished flat surface 35 and is formed with a plurality of tapped holes 37 for securing the flange 36 of the hopper 38. The hopper 38 is secured in any suitable manner, as by welding or the like, to the side enclosure structure 40 including a vertical side wall 41 that is fixed to the base 12 and a top wall 42 that is fixed to the top of the hopper.

The axial center of the base 12 is formed to receive the shaft 44 of electric motor 46 which is fixed to the under surface of base 12 by bolts 45. Spacers 47 may be employed to space the motor from base 12 to keep vibration at a minimum. The upper end of the shaft 44 is drilled and tapped to receive the bolt 48 which fixes the cutter head or rotor 18 to the shaft. A suitable lock washer is preferably employed in connection with bolt 48.

The cutter head or rotor or cylindrical member 18 comprises a pair of upper and lower spaced-apart plates 50 and 52. As shown in Figure 2, the plates 50 and 52 are separated by the spacer 54 and the bases 70 of the shearing blades, more fully discussed hereinafter. Referring to Figure 3, it will be seen that the upper plate is formed with a plurality of perforations 58 of relatively small size which communicate with the space between the plates. Fixed to the upper surface of the plate 50 is the chopper member 60 including arms 62 having sharpened edges 64 forming knife blades. The member 60 may be secured to the plate 50 by bolt 48, as shown, or by any other suitable means, and includes the depending studs 66 which are disposed in two of the holes or notches 67 formed in the upper plate 50.

Projecting upwardly through slots formed in the upper plate 50 are the saw-like, three-stepped, shearing cutter blades 68, which may also be termed grinders, and which are provided in pairs and are located symmetrically about and adjacent the periphery of the rotor or cutter head 18. The blades 68 project upwardly through slots formed in plate 50 from bases 70 which are fixed between the plates 50 and 52 by screws 76 securing these plates to each other. As shown in Figure 3, the bases include a rounded side portion 72 disposed in the plane of the periphery of the rotor or cutter head 18, one shoulder of which is formed with a cutting edge 74, and a flange portion 75 through which the screws 76 pass.

The lower plate 52 is imperforate, except for four holes for receiving screws 76 which secure the plates to each other and the hole through which the shaft extends. This bottom plate 52 is recessed slightly on the underside thereof at 78 to receive a resilient seat 80 which is urged into contact with a rigid ring 82 fixed in base 12, through which the shaft 44 extends, to provide a water-tight seal. The necessary compression force is provided by the action of the bolt 48 securing the rotor or cutter head 18 to the shaft 44.

As described in said application, the peripheries of said plates 50 and 52 may be notched as at 83 to break up fibrous materials that tend to become hung up between the cutter head or rotor 18 and the hopper wall. In the illustrated form of the invention two notches 83 are positioned between each set of shearing blades (see Figure 6).

Fixed to the inner surface of the hopper 38 is the plate 84 which is formed with slots 86 machined to closely accommodate the pairs of shearing blades 68. The lower end of the hopper, which depends into the hollow portion of the base 12, is formed with a ring of openings 88 with which the space between the plates 50 and 52 is aligned. The openings 88 are preferably somewhat smaller in width than the perforations 58 in upper plate 50 are in diameter.

Several of the elements of the illustrated device have been modified to render food waste disposer 10 particularly adapted to handle fibrous types of food waste, such as corn cob husks. The knife blades 62 of the member 60 are somewhat shorter in height than those of the corresponding member of my said application and are arranged so that the edges 64 thereof are inclined from the bases thereof to the tips thereof, so that fibrous materials cannot catch on the knife blades. Edges 64 are thus inclined away from the direction of rotation indicated by the arrow in Figure 3. The base 90 of member 60 is extended outwardly of the knife blades 62 and a smaller knife blade 92 having a vertical cutting edge 94 is fixed to each end thereof. The cutting edges 94 are arranged to cooperate with the vertical surface 96 on the plate 84 to provide a cutting action upon rotation of the rotor 18. The plurality of holes 67 is provided to make the member 67 adjustable in position on rotor 18 with respect to the other elements thereon. It is desirable to position it as shown in Figure 6, however, so that a blade 92 does not engage the surface 96 at the same time that a set of shearing blades are passing through slots 86.

As shown in Figure 5, the rear corner of the plate 84 is rounded off as at 98. It was found that fibers tended to collect between the lower edge of plate 84 and the upper surface of plate 50, causing considerable friction and increasing power requirements. The rounded edge 98 in the rear side of plate 84, with respect to the direction of rotation of the cutter head or rotor 18 and the shearing blades 68 carried thereby, eliminates this objectionable build up.

Additionally, a plurality of nibs or block elements 100 having smooth curved surfaces 102 and cutting edge 104 (see Figure 6) are fixed to the inner surface of hopper 38 adjacent the upstream side of rotor 18. The cutting edge 104 of elements 100 (see Figure 6) cooperates with the outer shearing blade 68 of each set of shearing blades to cut fibers that become lodged in the stepped portions of these blades (see Figure 6). The blocks 100 are preferably substantially equal in height to the height of blades 62. The lower ends of blocks 100 are positioned closely adjacent the upstream surface of plate 50, and among other things, prevent the build up of fibrous material around the periphery of the rotor.

A further modification enabling my invention to better handle fibrous materials is in the provision of bevelled edges 106 and 108 on the respective plates 50 and 52 and making the openings 88 in the form of slots rather than rounded perforations, as disclosed in my aforementioned application. Preferably, the cutter head or rotor 18 fits within the lower end of hopper 38 with relatively close tolerances, for instance, 0.001 to 0.005 inch. It has been found that by beveling the periphery of the plates 50 and 52 to reduce the outermost periphery of each plate to a minimum, a tendency of fibrous materials to build up around and between the periphery of the rotor 18 and the adjacent wall of hopper 38 is eliminated. Also, the line contact of plates 50 and 52, with the hopper 38, where there is contact, insures that friction will be at a minimum, thus eliminating undesirable drag. The formation of openings 88 in the form of slots rather than rounded perforations prevents fibrous material from hanging up in the openings. As shown in Figure 4, the slots are formed by outwardly diverging surfaces 110 providing sharp edges 112 on each side of the openings with which the edge 74 of shearing blade bases 70 cooperates. In order to reduce the torque load, the cutting edges 74 and the slots 88 are preferably so arranged relative to each other that in operation, at any one time, only one cutting edge 74 is adjacent to a slot 88. This may be accomplished as shown in the drawings by providing an even number of cutting edges 74 spaced equidistantly and by providing an odd number of slots 88 also spaced equidistantly.

I have also found it advisable to round off all edges of the plate 84, including the curved element 114 with which the plate 84 is integral, as well as the merging surfaces between these two elements. The plate 84 is preferably secured to the hopper wall by frangible bolts 116 which will break if a hard object, such as a piece of silverware or the like, is accidently dropped into the device. This prevents damage to the device and possible injury to the operator that might otherwise happen due to the high speeds at which the rotor is preferably operated.

In operation, the motor for actuating the cutter head or rotor 18 is turned on, and the rotor is rotated at a relatively high rate of speed, for instance, seventeen hundred and fifty revolutions per minute, in the direction indicated by the arrow in Figures 3 and 6. Food waste such as corn husks or the like and a quantity of water are fed into the hopper 38, preferably continuously for best results, and are mixed as the blades of the cutter head or rotor 18 act on the food waste. The hopper acts as a conduit for delivering the mixture to the revolving cutter head or rotor 18.

The knife blades 62 chop and beat the waste freeing the fibrous matter comprising the waste which moves under centrifugal force toward the sidewall of the chamber. The fibrous materials and other relatively tough unbroken chunks are acted on by the shearing blades 68 and the cutting blades 92 in cooperation with the plate 84. The angled side 85 on the upper portion of plate 84 and the nibs or blocks 100 tend to move the material being cut by these elements back toward the center of the mixture. The nibs or blocks 100 in cooperation with the outer shearing blades 68 cut all fibrous material that may become hung or caught on the stepped portions of these blades. There is thus a back and forth action of the mixture across the upstream surface of rotor 18 in which the mixture moves toward the periphery of the rotor under centrifugal force and is directed back toward the center of the rotor by angled side 85 of plate 84 and blocks 100.

The different types of cutters act on the food waste until it is in sufficiently small particles to pass downwardly with the water through the perforations in the plate 50 into the space between the plates 50 and 52. The small particles tend to be further reduced in size during this step due to the shearing force acting on them as they pass through these relatively small perforations. The mixture of food waste and water is then thrown outwardly of the axis of the cutter head or rotor 18 by centrifugal force toward the periphery of the cutter head or rotor and the openings 88 of the hopper. As the mixture of food waste and water passes from the space between the plates 50 and 52 into the slots 88, the cutting edges 74 act to further reduce the particles in size and force the particles through these slots. Upon leaving the openings 88, the mixture of water and food waste enters the hollow portion of the base and passes from the base 12 into pipe 28 from which it may pass into a sewage system port.

As indicated in my aforementioned application, one of the salient features of the device is that it creates a pumping action which draws the mixture of food waste and water through the cutter head and hopper openings with substantial force. This aids materially in the rapid disintegration of the food waste. As the rotation of the cutter head or rotor 18 builds up to total speed, a pressure differential builds up and atmospheric pressure then lends its aid in forcing the mixture through the device. It will therefore be seen that the individual items of food waste are subjected to substantial disintegrating forces as they travel through the disposer, and that the disintegrated waste particles are quickly drawn or sucked away from the bulk of food waste above the rotor.

A further important feature of the device is that reduction is accomplished in two separate chambers, namely, the space above or upstream side of the cutter head or rotor and the space between the plates 50 and 52 of the cutter head. The cutting means in the upper chamber provides most of the disintegrating action above the rotor, while centrifugal force and the action of edge 74 of shearing blade bases 70 in cooperating with the slots 88 provide the disintegrating action within and downstream of the rotor.

Another important feature of my device is that it requires substantially less horsepower than is required to run comparable units of like capacity. This is because friction is kept at a minimum and build up of fibrous materials, thereby causing drag, is eliminated.

The foregoing description and the drawings are given merely to explain and illustrate my invention, and the manner in which it may be performed, and the invention is not to be limited thereto, except in so far as the appended claims are so limited since those skilled in the art who have my disclosure before them will be able to make modifications and variations therein without departing from the scope of the invention.

I claim:

1. In a device of the type described including a generally cylindrical rotor mounted within and substantially closing off a generally cylindrical hopper member, said rotor being positioned above the lower rim of the inner surface of said hopper member, said rotor being of a size to fit with the hopper member with relatively close tolerances, and carrying comminuting means fixed to the upstream side thereof, said rotor being formed with an internal chamber that is open at the periphery of the rotor and straining means in the upstream side of the rotor that is in communication with said chamber, further straining means formed in said hopper member about the periphery of said rotor and aligned with the opening of said chamber, and means for rotating the rotor at a relatively high speed, the improvement wherein the upstream and downstream sides of said rotor are bevelled at the periphery thereof.

2. The improvement set forth in claim 1 wherein the comminuting means comprises a pair of symmetrically positioned cutting blades fixed to the upstream side of said rotor on each side of the axis of rotation thereof, and projecting axially of the rotor, with the cutting edges of each blade being inclined rearwardly of the direction of rotation of the rotation from the base thereof to the top of the blade.

3. The improvement set forth in claim 1 wherein the comminuting means comprises a plurality of symmetrically positioned shearing blades fixed to the upstream side of said rotor about the periphery thereof, a stationary plate fixed to said hopper member adjacent the upstream side of the rotor, said plate extending generally radially of the rotor and being formed with slot means aligned with said shearing blades and adapted to provide a shearing cutting action upon rotation of said rotor, with the downstream edge of said plate being convexly rounded on the rear side thereof.

4. The improvement set forth in claim 3 wherein said plate is fixed to said hopper member by frangible means.

5. The improvement set forth in claim 3 wherein said shearing blades are stepped in configuration and including at least one rigid element fixed to the inside surface of said hopper adjacent the upstream side of said rotor and spaced from said plate, said element being formed with a surface to cooperate with said shearing blades to provide a cutting action apart from said shearing cutting action upon rotation of said rotor.

6. The improvement set forth in claim 1 wherein the second mentioned straining means comprises a plurality of slots formed in said hopper member and in alignment with the periphery of said rotor, said slots extending generally parallel to the axis of rotation of said rotor.

7. A device of the type described comprising a cylindrical conduit, a generally cylindrical rotor mounted in said conduit for rotation about the longitudinal axis of said conduit, and cutting means fixed to said rotor and projecting from the upstream side thereof, said cutting means comprising a plurality of shearing blades positioned adjacent the periphery of said rotor, a stationary plate fixed to said conduit adjacent the upstream side of said rotor, said plate being formed with slot means aligned with said shearing blades and adapted to provide a shearing cutting action upon rotation of said rotor, with the downstream edge of said plate being rounded on the rear side thereof, said cutting means further comprising a pair of symmetrically positioned cutting blades, said cutting blades each being formed with a cutting edge extending generally axially of said conduit, said plate being formed with a surface extending axially of said conduit and adapted to cooperate with said cutting edges to provide a cutting action upon rotation of said rotor.

8. A device of the type described comprising a cylindrical hopper, a hollow base supporting said hopper, a cylindrical rotor mounted for rotation about the central axis of said hopper, said rotor being disposed within said hopper, said rotor being formed in the periphery thereof with a relatively deep radially extending slot, with the upstream side of said rotor being formed with a plurality of openings leading to said slot, said rotor being of a size to fit within said conduit with relatively close tolerances, said hopper being formed with a plurality of openings in alignment with the periphery of said rotor, cutting means fixed to said rotor and projecting from the upstream side thereof, said cutting means comprising a pair of symmetrically positioned cutting blades, with the cutting edges of each blade being inclined from the base thereof to the top of the blade, said cutting means further including a further pair of symmetrically positioned cutting blades, a stationary plate fixed to the inside surface of said hopper adjacent the upstream side of said rotor, said plate being formed with a surface adapted to cooperate with the cutting edges of said further pair of blades to provide a cutting action upon rotation of said rotor, said cutting means also comprising a plurality of shearing blades positioned adjacent the periphery of said rotor, said plate being formed with slot means aligned with said shearing blades and adapted to provide a shearing cutting action upon rotation of said rotor, and at least one rigid element fixed to the inside surface of said hopper adjacent the said upstream side of said rotor and spaced from said plate, said element being formed with a surface adapted to cooperate with said shearing blades to provide a cutting action apart from said shearing cutting action upon rotation of said rotor, said openings in said hopper leading to said hollow base.

9. A food waste disposer comprising a base formed with an upwardly opening chamber surrounded by a generally circular neck-like portion formed with a flat upwardly facing surface that is generally horizontally disposed, a generally cylindrical rotor rotatably mounted at the axial center of said chamber, means for rotating said rotor at a relatively high speed, comminuting means carried by the upwardly facing side of said rotor, a generally rounded hopper member surrounding said rotor, an annular flange fixed to and surrounding the outer surface of said hopper, said flange overlying and being fixed to said surface of said neck-like portion, said hopper being formed with a plurality of slots thereabout and in alignment with said rotor, said slots extending generally parallel to the axis of rotation of said rotor, and a food waste discharge outlet formed in said base.

References Cited in the file of this patent

UNITED STATES PATENTS

| | | |
|---|---|---|
| 2,012,680 | Hammes | Aug. 27, 1935 |
| 2,482,124 | Powers | Sept. 20, 1949 |
| 2,536,929 | Hammell | Jan. 2, 1951 |
| 2,577,152 | Powers | Dec. 4, 1951 |
| 2,665,853 | Nicholson | Jan. 12, 1954 |
| 2,753,121 | Elfenbein | July 3, 1956 |

FOREIGN PATENTS

| | | |
|---|---|---|
| 682,046 | Great Britain | Nov. 5, 1952 |